(12) United States Patent  
Santhoff et al.

(10) Patent No.: US 8,711,898 B2  
(45) Date of Patent: Apr. 29, 2014

(54) ULTRA-WIDEBAND COMMUNICATION SYSTEM AND METHOD

(71) Applicant: Intellectual Ventures Holding 73 LLC, Las Vegas, NV (US)

(72) Inventors: John Santhoff, San Diego, CA (US); Steven Moore, San Diego, CA (US)

(73) Assignee: Intellectual Ventures Holding 73 LLC, Las Vegas, NV (US)

( * ) Notice: Subject to any disclaimer, the term of this patent is extended or adjusted under 35 U.S.C. 154(b) by 0 days.

(21) Appl. No.: 13/621,921

(22) Filed: Sep. 18, 2012

(65) Prior Publication Data

US 2013/0022081 A1    Jan. 24, 2013

Related U.S. Application Data

(62) Division of application No. 10/449,789, filed on May 30, 2003, now Pat. No. 8,379,736.

(51) Int. Cl.
*H04B 1/00* (2006.01)

(52) U.S. Cl.
USPC ......... 375/130; 375/260; 375/267; 455/226.3

(58) Field of Classification Search
USPC ............... 375/130, 259, 260, 267; 455/226.3
See application file for complete search history.

(56) References Cited

U.S. PATENT DOCUMENTS

| | | | |
|---|---|---|---|
| 3,668,639 A | 6/1972 | Harmuth | |
| 3,678,204 A | 7/1972 | Harmuth | |
| 3,728,632 A | 4/1973 | Ross | |
| 4,641,317 A | 2/1987 | Fullerton | |
| 4,979,186 A | 12/1990 | Fullerton | |
| 5,146,616 A | 9/1992 | Tang et al. | |
| 5,363,108 A | 11/1994 | Fullerton | |
| 5,677,927 A | 10/1997 | Fullerton et al. | |

(Continued)

FOREIGN PATENT DOCUMENTS

| | | |
|---|---|---|
| EP | 1 175 128 | 1/2002 |
| GB | 2 406 481 | 3/2005 |

(Continued)

OTHER PUBLICATIONS

Anna Scaglione, "Differential Direct Sequence Spread Spectrum for Ultra-Wideband Low power Wireless Microsystems", University of New Mexico, Dept. of EECE, Albuquerque, NM, Dec. 5, 2006, 5 pages.

(Continued)

*Primary Examiner* — Curtis Odom

(57) ABSTRACT

The present invention provides systems and methods for communication between ultra-wideband (UWB) devices. In general, the UWB device may characterize the attenuation, and other characteristics of the communication environment. Using these characteristics the UWB device can adapt various communication parameters to improve the communication quality. The UWB device may use these characteristics to establish zones and sectors for communication with other UWB devices. Based on this zone and sector assignment the UWB device may select communication parameters for communication with other UWB devices. This Abstract is provided for the sole purpose of complying with the Abstract requirement rules that allow a reader to quickly ascertain the subject matter of the disclosure contained herein. This Abstract is submitted with the explicit understanding that it will not be used to interpret or to limit the scope or the meaning of the claims.

20 Claims, 10 Drawing Sheets

BER Request Message

BER Response Message

(56) References Cited

U.S. PATENT DOCUMENTS

| | | | |
|---|---|---|---|
| 5,687,169 | A | 11/1997 | Fullerton |
| 5,748,891 | A | 5/1998 | Fleming et al. |
| 5,920,278 | A | 7/1999 | Tyler et al. |
| 6,002,708 | A | 12/1999 | Fleming et al. |
| 6,026,125 | A | 2/2000 | Larrick, Jr. et al. |
| 6,031,862 | A | 2/2000 | Fullerton et al. |
| 6,108,315 | A | 8/2000 | Freeburg et al. |
| 6,178,217 | B1 | 1/2001 | Defries et al. |
| 6,275,544 | B1 | 8/2001 | Aiello et al. |
| 6,281,784 | B1 | 8/2001 | Redgate et al. |
| 6,505,032 | B1 | 1/2003 | McCorkle et al. |
| 6,539,213 | B1 * | 3/2003 | Richards et al. ........... 455/226.3 |
| 6,711,216 | B2 | 3/2004 | Hannah |
| 6,748,220 | B1 * | 6/2004 | Chow et al. ................... 455/450 |
| 6,967,998 | B1 * | 11/2005 | Chen et al. ................... 375/224 |
| 6,973,622 | B1 * | 12/2005 | Rappaport et al. ........... 715/735 |
| 2001/0033610 | A1 | 10/2001 | Chastain |
| 2002/0075972 | A1 | 6/2002 | Richards et al. |
| 2002/0076193 | A1 | 6/2002 | Melick et al. |
| 2002/0125818 | A1 | 9/2002 | Sato et al. |
| 2002/0164997 | A1 | 11/2002 | Parry |
| 2003/0096578 | A1 | 5/2003 | McCorkle et al. |

FOREIGN PATENT DOCUMENTS

| | | |
|---|---|---|
| JP | 2003-110531 | 1/2002 |
| WO | WO-00/77949 | 12/2000 |
| WO | WO-01/08230 | 2/2001 |
| WO | WO-01/39451 | 5/2001 |
| WO | WO-01/91203 | 11/2001 |
| WO | WO-01/93434 | 12/2001 |
| WO | WO-02/27964 | 4/2002 |
| WO | WO-02/31986 | 4/2002 |
| WO | WO-02/49378 | 6/2002 |
| WO | WO-02/49379 | 6/2002 |
| WO | WO-2004/032358 | 4/2004 |

OTHER PUBLICATIONS

D'Andrade Brian W et al, "High-efficiency yellow double-doped organic light-emitting devices based on phosphor-sensitized fluorescence" Applied Physics Letters, vol. 79, No. 7, Aug. 13, 2001, pp. 1045-1047.

Ex Parte Quayle Action on U.S. Appl. No. 10/449,789, mailed Apr. 24, 2012.

Fernando Ramirez-Mirales, "On Performance of Ultra Wideband Signals in Gaussian Noise and Dense Multipath", Paper 99C265, Accepted for Publication in the IEEE Transactions on Vehicular Technology, USC Ultralab, 2001, 10 pages.

Fernando Ramirez-Mireles, Robert A. Scholtz, "N-Orthogonal Time-Shift-Modulated Codes for Impulse Radio", Report from Joint Services Electronics Program Contract F 49620-94-0022, CTMC 1997, IEEE Wireless 98, Jul. 1998, 1 page.

Final Office Action on U.S. Appl. No. 10/449,789, mailed Oct. 4, 2005.

Henning F. Harmuth, "Applications of Walsh functions in communications", IEEE Spectrum, Nov. 1969, pp. 82-91, USA.

Henning F. Harmuth, "Frequency-Sharing and Spread-Spectrum Transmission with Large Relative Bandwidth", IEEE Transactions on Electromagnetic Compatibility, vol. EMC-20, No. 1, Feb. 1978, USA.

International Search Report and Written Opinion on PCT/JP2004/014011, mailed Apr. 14, 2005.

Moe Z. Win, George Chrisikos, Nelson R. Sollenberger, "Performance of Rake Reception in Dense multipath Channels: Implications of Spreading Bandwidth and Selection Diversity Order", IEEE Journal on Selected Areas on Communications, vol. 18, No. 8, pp. 1516-1525, Aug. 2000, USA.

Moe Z. Win, Zoran A. Kostic, "Impact of Spreading Bandwidth on Rake Reception in Dense Multipath Channels", IEEE Journal on Selected Areas on Communications, vol. 17, No. 10, pp. 1794-1806, Oct. 1999, USA.

Multispectral Solutions, Inc., "Revision of Part 15 of the Commission's Rules Regarding Ultra-Wideband Transmission Systems" Sep. 12, 2000, 38 pages.

Non-Final Office Action on U.S. Appl. No. 10/449,789, mailed Apr. 6, 2005.

Notice of Allowance on U.S. Appl. No. 10/449,789, mailed Oct. 11, 2012.

Robert A. Scholtz, P. Vijay Kumar, Carlos J. Corrada-Bravo, "Signal Design for Ultra-wideband Radio", Department of Electrical Engineering, University of Southern California, Los Angeles, CA, 2004, 15 pages.

Robert Fleming, Cherie Kusher, "Integrated, Low-Power, Ultra-Wideband Transceivers for Distriubted Position Location and Communication", Semi-Annual Technical Report Contract J-BFI-94-058, Aether Wire & Location, Inc. Jul. 1995, Nicasio, CA, 76 pages.

Robert Fleming, Cherie Kusher, "Low-Power, Miniature, Distributed Position Location and Communication Devices Using Ultra-Wideband, Nonsinusoidal Communication Technology", Semi-Annual Technical Report Contract J-BFI-94-058, Aether Wire & Location, Inc. Jul. 1995, Nicasio, CA, 44 pages.

Supplementary European Search Report for Application 04751407.0, mailed Nov. 20, 2007.

Supplementary European Search Report for Application 04751407.0, mailed Aug. 9, 2007.

* cited by examiner

FIGURE 5

| Destination Address | Source Address | Time Of Transmission | ... |

Distance Request Message

| Destination Address | Source Address | Distance | Time of Transmission | ... |

Distance Response Message

FIGURE 7

| Destination Address | Source Address | Fixed Energy Request | ... |

Fixed Energy Request Message

| Destination Address | Source Address | RSSI | ... |

Fixed Energy Response Message

ULTRA-WIDEBAND COMMUNICATION SYSTEM AND METHOD

CROSS-REFERENCE TO RELATED PATENT APPLICATIONS

This application is a divisional of U.S. patent application Ser. No. 10/449,789, filed on May 30, 2003.

FIELD

The present disclosure relates generally to the field of wireless communications, and more specifically to ultra-wideband wireless communication that employs several communication parameters.

BACKGROUND

The wireless device industry has recently seen unprecedented growth. With the growth of this industry, communication between wireless devices has become increasingly important. There are a number of different technologies for inter-device communications. Radio Frequency (RF) technology has been the predominant technology for wireless device communications. Alternatively, electro-optical devices have been used in wireless communications. Electro-optical technology suffers from low ranges and a strict need for line of sight. RF devices therefore provide significant advantages over electro-optical devices.

Conventional RF technology employs continuous sine waves that are transmitted with data embedded in the modulation of the sine waves' amplitude or frequency. For example, a conventional cellular phone must operate at a particular frequency band of a particular width in the total frequency spectrum. Specifically, in the United States, the Federal Communications Commission has allocated cellular phone communications in the 800 to 900 MHz band. Generally, cellular phone operators divide the allocated band into 25 MHz portions, with selected portions transmitting cellular phone signals, and other portions receiving cellular phone signals.

Another type of inter-device communication technology is ultra-wideband (UWB). UWB wireless technology is fundamentally different from conventional forms of RF technology. UWB employs a "carrier free" architecture, which does not require the use of high frequency carrier generation hardware; carrier modulation hardware; frequency and phase discrimination hardware or other devices employed in conventional frequency domain communication systems. UWB communications systems and devices additionally benefit from the capability to measure distance and geo-position. Generally, these UWB devices measure the time it takes for a UWB pulse, or signal to travel from one UWB device to another UWB device, and use the speed of light to determine the distance between UWB devices.

However, the broad concept of using time and the speed of light to determine distance has been employed for centuries. The first recorded attempts to establish the speed of light by the use of distance date back to the experiments of Galileo in the 1600s. His only conclusion based on his terrestrial experiments was that light moves very fast. In 1676, Olaf Roemer was able to measure the speed of light to be approximately $2.14 \times 10^8$ based on his assumptions of the distance between Jupiter and the Earth. The current accepted measurement of $2.9997924588 \times 10^8$ was obtained using laser interferometery.

In theory, a wireless ultra-wideband (UWB) communications pulse, or signal transmitted from a source and received by a target arrives without any delays or distortions caused by the surrounding environment. Such an ideal environment is difficult to realize outside the vacuum of outer space. In more practical environments and especially in urban settings, the environment may have a substantial impact on the reception of a UWB pulse, or signal.

Generally, the distance between communicating devices affects the quality of the communications channel. Electromagnetic radiation dissipates proportionally to distance squared. Additionally, the terrain affects radio waves. Thus, the opportunity for multi-path, or "fading" effects generally increases with distance. There are essentially two types of fading in electromagnetic communications. Local multi-path fluctuation is known as fast-fading or Raleigh fading. More distance fading effects may be caused by long term variation in average power levels, slow fading or log-normal fading, which is caused by movement over distances long enough to produce significant variations in the signal path length. Multi-path reflections can also cause a signal to arrive at the receiver in multiple reflections, each at a different time. This is commonly referred to as delay spread. As signal strength attenuates or decreases, the signal-to-noise ratio (SNR) degrades as well, generally leading to increased bit-error-rates (BER).

Therefore, there exists a need for an ultra-wideband communication system that provides reliable communication at a variety of distances, and in a variety of environments.

SUMMARY OF THE INVENTION

The present invention provides reliable systems and methods for communication between ultra-wideband (UWB) devices located a variety of distances from each other. One method of the present invention selects at least one communication parameter that enables reliable communication between UWB devices. This method comprises transmitting a time request signal from a first UWB device to a time synchronized UWB device. The time synchronized UWB device sends a response message to the first UWB device, which determines a time difference between the time of receipt of the time response message and the time of transmission contained within the time response message. A communication parameter is the selected, based at least on the time difference.

Another embodiment of the present invention characterizes the attenuation characteristics of the wireless medium though which the UWB devices are transmitting. Using these characteristics the UWB devices can adapt various communication parameters to improve the quality of communications.

These and other features and advantages of the present invention will be appreciated from review of the following detailed description of the invention, along with the accompanying figures in which like reference numerals refer to like parts throughout.

BRIEF DESCRIPTION OF THE DRAWINGS

FIG. 5 shows a distance request message and an associated distance response message in accordance with one embodiment of the present invention;

FIG. 7 shows a fixed energy request message and an associated fixed energy response message in accordance with one embodiment of the present invention;

Figure 1:
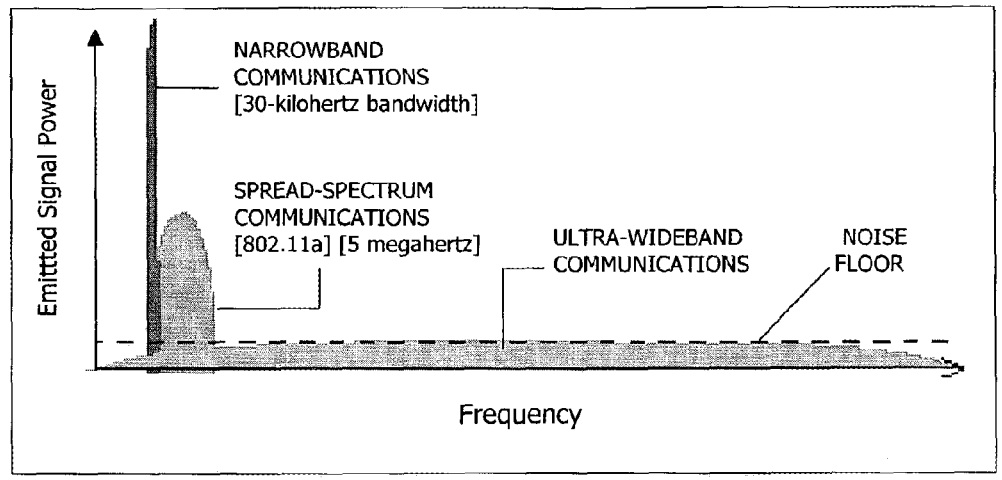
FIG. 1 is an illustration of different communication methods.

It will be recognized that some or all of the Figures are schematic representations for purposes of illustration and do not necessarily depict the actual relative sizes or locations of the elements shown.

DETAILED DESCRIPTION OF THE PREFERRED EMBODIMENTS

In the following paragraphs, the present invention will be described in detail by way of example with reference to the attached drawings. Throughout this description, the preferred embodiment and examples shown should be considered as exemplars, rather than as limitations on the present invention. As used herein, the "present invention" refers to any one of the embodiments of the invention described herein, and any equivalents. Furthermore, reference to various feature(s) of the "present invention" throughout this document does not mean that all claimed embodiments or methods must include the referenced feature(s).

The present invention provides reliable systems and methods for communication between ultra-wideband (UWB) devices located a variety of distances from each other. Generally, each UWB device employing the methods of the present invention may use various communication parameters in response to different distance, power, environmental, and other conditions when communicating with each other.

One method of the present invention selects at least one communication parameter that enables reliable communication between UWB devices. This method comprises transmitting a time request signal from a UWB device to a time synchronized UWB device. The time synchronized UWB device sends a response message to the first UWB device, which determines a time difference between the time of receipt of the time response message and the time of transmission contained within the time response message. A communication parameter is the selected, based at least on the time difference.

Another embodiment of the present invention characterizes the attenuation characteristics of the wireless medium though which the UWB devices are transmitting. Using these characteristics the UWB devices can adapt various communication parameters to improve the quality of communications.

In another embodiment of the present invention, a UWB enabled wireless device obtains distance information to at least one other UWB enabled wireless device. The distance information is then used to determine a zone location for each UWB device. Specific communication parameters are then employed for each zone. When communicating with other UWB enabled devices the first UWB device adapts its communication parameters in accordance with the zone parameters.

In another embodiment of the present invention, a UWB enabled device obtains Received Signal Strength Indicator (RSSI) information from at least one UWB enabled device. The first UWB device uses the RSSI information to derive RSSI-based zones for communication with the UWB enabled devices. Alternatively, the first UWB device may use the RSSI and distance information to characterize the communications environment within the zone.

In a still further embodiment of the present invention, an access point assigns communication frame parameters to each zone to reduce the probability of multi-user interference.

Conventional radio frequency technology employs continuous sine waves that are transmitted with data embedded in the modulation of the sine waves' amplitude or frequency. For example, a conventional cellular phone must operate at a particular frequency band of a particular width in the total frequency spectrum. Specifically, in the United States, the Federal Communications Commission has allocated cellular phone communications in the 800 to 900 MHz band. Cellular phone operators use 25 MHz of the allocated band to transmit cellular phone signals, and another 25 MHz of the allocated band to receive cellular phone signals.

Another example of a conventional radio frequency technology is illustrated in FIG. 1. 802.11 a, a wireless local area network (LAN) protocol, transmits radio frequency signals at a 5 GHz center frequency, with a radio frequency spread of about 5 MHz.

Figure 2:
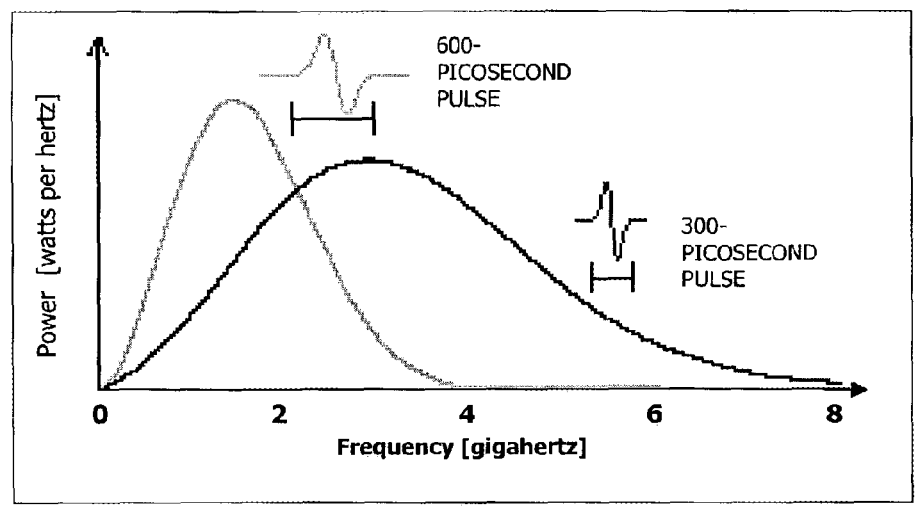
FIG. 2 is an illustration of two ultra-wideband pulses.

In contrast, a UWB pulse may have a 1.8 GHz center frequency, with a frequency spread of approximately 3.2 GHz, as shown in FIG. 2, which illustrates two typical UWB pulses. FIG. 2 illustrates that the narrower the UWB pulse in time, the broader the spread of its frequency spectrum. This is because frequency is inversely proportional to the time duration of the pulse. A 600 picosecond UWB pulse may have about a 1.8 GHz center frequency, with a frequency spread of approximately 1.6 GHz. And a 300 picosecond UWB pulse may have about a 3 GHz center frequency, with a frequency spread of approximately 3.2 GHz. Thus, UWB pulses generally do not operate within a specific frequency, as shown in FIG. 1. And because UWB pulses are spread across an extremely wide frequency range, UWB communication systems allow communications at very high data rates, such as 100 megabits per second or greater.

Further details of UWB technology are disclosed in U.S. Pat. No. 3,728,632 (in the name of Gerald F. Ross, and titled: Transmission and Reception System for Generating and Receiving Base-Band Duration Pulse Signals without Distortion for Short Base-Band Pulse Communication System), which is referred to and incorporated herein in its entirety by this reference.

Also, because the UWB pulse is spread across an extremely wide frequency range, the power sampled at a single, or specific frequency is very low. For example, a UWB one-watt signal of one nano-second duration spreads the one-watt over the entire frequency occupied by the pulse. At any single frequency, such as a cellular phone carrier frequency, the UWB pulse power present is one nano-watt (for a frequency band of 1 GHz). This is well within the noise floor of any cellular phone system and therefore does not interfere with the demodulation and recovery of the original cellular phone signals. Generally, the multiplicity of UWB pulses are transmitted at relatively low power (when sampled at a single, or specific frequency), for example, at less than −30 power decibels to −60 power decibels, which minimizes interference with conventional radio frequencies.

As described above, wireless devices communicate with Radio Frequency (RF) energy. Conventional technologies for RF communications employ RF carrier waves. Data is modulated onto the carrier wave, amplified and transmitted from the first RF device. A second RF wireless device receives the carrier wave, amplifies the wave, and demodulates the data. RF communications suffer from fading, multi-path interference, and channel attenuation. Since RF energy strength is proportional to the inverse of the transmitted distance squared, the quality of RF wireless device communication is dependent on the relative location of the RF devices that are communicating. Atmospheric conditions, terrain, natural and man-made objects can additionally degrade the received signal strength of RF communications.

As is well known in the art, propagation of RF energy is strongly influenced by the environment, both man-made and natural. For example, urban areas are generally dominated by large man-made structures. Suburban areas typically contain residential structures, and rural areas may be more open, with wooded areas and the occasional man-made structure.

One feature of the present invention is that it adapts communication parameters to maximize the communication quality between UWB enabled devices. Thus, one assortment of communication parameters may be used for urban areas, another assortment for residential areas, with yet another assortment used for rural areas. The assortment is not fixed for each environment, rather the communication parameters used in each environment may be altered, or other communication parameters may be employed to obtain the best possible communication quality.

The distance between communicating devices is one important characteristic in communications quality. There are numerous methods of establishing distance between communicating devices. One feature of ultra-wideband (UWB) systems is that they can determine the time of arrival of a UWB pulse, or signal very precisely. For example, UWB systems can determine pulse or signal time of arrival (TOA) to within 200 pico-seconds. With an approximate propagation speed of 10 centimeters per nano-second, this UWB system may be capable of accurately measuring distance to approximately 2 centimeters. As time resolutions decrease in UWB devices, their ability to resolve distance is further enhanced. Thus, because UWB technology can determine TOA to very precise resolutions, accurate distances can be determined.

Co-pending U.S. patent application Ser. No. 09/805,735, filed Mar. 13, 2001, titled: MAINTAINING A GLOBAL TIME REFERENCE AMONG A GROUP OF NETWORKED DEVICES, teaches synchronization of UWB enabled devices to a single master time reference. This application is incorporated herein in its entirety by this reference. Once the communicating UWB devices are synchronized to the master time reference, distance measurements may be made by any of the communicating devices. To determine distance, a receiving UWB device only needs to know the time of transmission and the time of arrival of the UWB pulse, or signal. Since the communicating UWB devices are synchronized to the same master time reference, the reference for the time of transmission is consistent between the UWB devices. The time of arrival of the UWB signal is determined by the receiving device, and contained within the UWB signal is the signal's time of transmission. The distance between UWB devices is obtained by determining the difference between the transmission time and the arrival time, and multiplying it by the UWB signal speed. Because the transmission time and the arrival time are both referenced to the same master time reference, the distance calculation will be accurate.

Another method of determining the distance between ultra-wideband (UWB) devices is disclosed in the following co-pending United States patent application that is herein incorporated in its entirety by this reference: USE OF THIRD PARTY ULTRA-WIDEBAND DEVICES TO ESTABLISH GEO-POSITIONAL DATA, Ser. No. 10/263,213, filed Aug. 28, 2002, which is a continuation-in-part of U.S. Pat. No. 6,519,464, titled: USE OF THIRD PARTY ULTRA-WIDEBAND DEVICES TO ESTABLISH GEO-POSITIONAL DATA, Ser. No. 09/745,498, filed Dec. 22, 2000, which claims priority to U.S. provisional patent application Ser. No. 60/255,469, filed Dec. 14, 2000, titled: ULTRA-WIDEBAND COMMUNICATION SYSTEM AND METHOD.

In the above-incorporated reference, an UWB device may determine it geographical position based on the position of other UWB devices. In this embodiment, a first UWB device may send a position request message to two, or more UWB devices that know their geographical location. The other UWB devices would respond with a message that includes their geographical location. The first UWB device may then determine its own geographical position based on the geographical location of the responding UWB devices. Communication parameters may then be selected based on the distance between the UWB devices.

One embodiment of the present invention uses distance as one factor to select various communications parameters. Other embodiments of the present invention may use a data bit-error-rate (BER) and/or a received signal strength indicator (RSSI) as factors in selecting communication parameters. In addition, one embodiment of the present invention may use the derived distance information to designate "zones" that extend outward from the UWB device. Sets of communication parameters may then be assigned for each zone.

Figure 3:
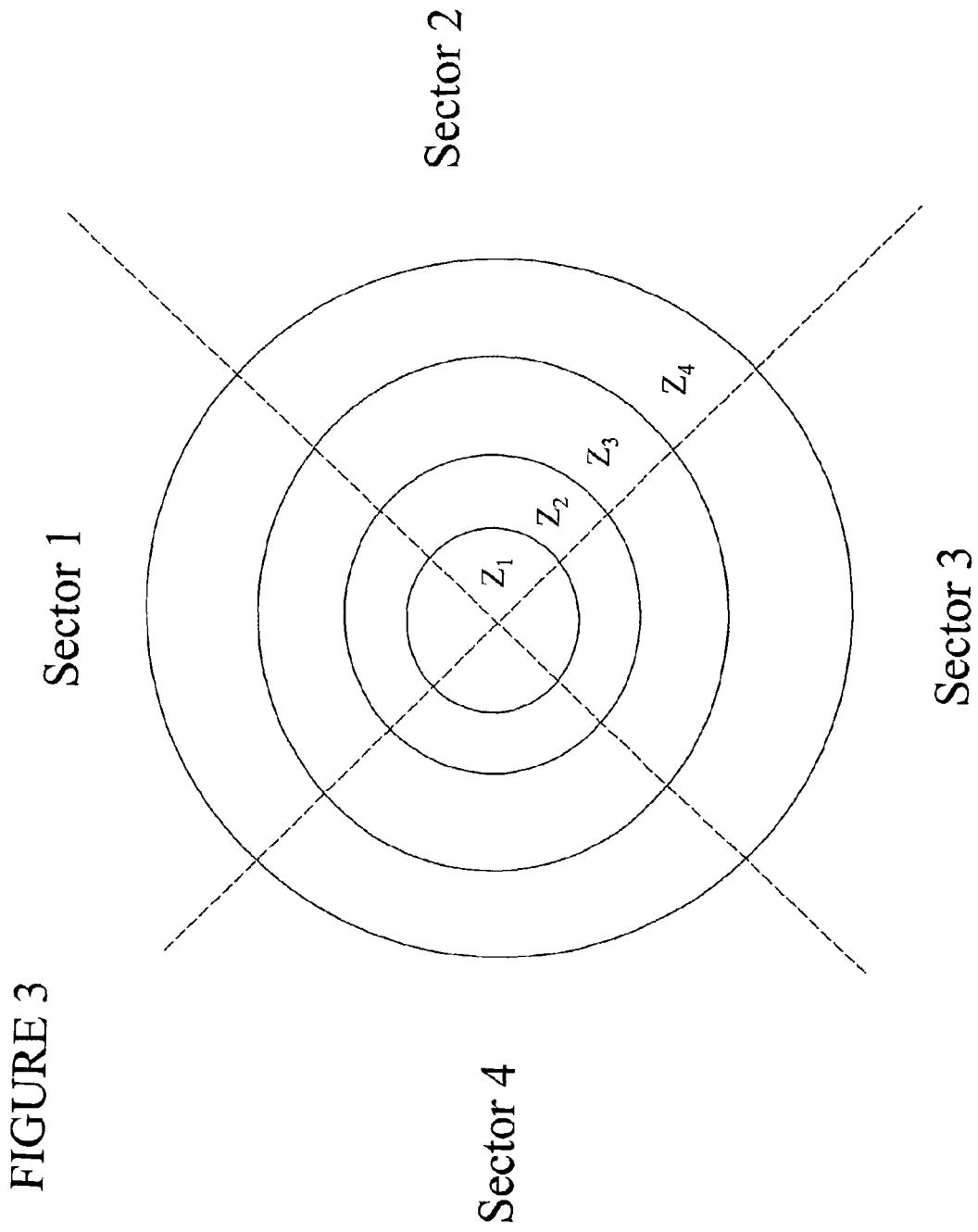
FIG. 3 is an illustration of zones and sectors established by a UWB device in accordance with one embodiment of the present invention.

However, UWB pulse, or signal propagation characteristics may vary within each zone. As shown in FIG. 3, zones Z1, Z2, Z3 and Z4 emanate outward from a UWB device (not shown) located at the center of zone Z1. For convenience of illustration, only four zones are illustrated, however embodiments of the present invention may have less than or more than four zones.

One feature of the present invention enables more accurate selection of communication parameters by partitioning each zone into discrete sectors. Sectorization may be accomplished in a number of ways. In one embodiment, sectors are assigned as portions of a circle measured in degrees. Shown in FIG. 3, a four-sector system, including sector 1, sector 2, sector 3 and sector 4 would comprise 90-degree portions of each zone Z1, Z2, Z3 and Z4. Depending upon the communications environment, and other factors, the number of sectors may be greater than, or less than the four illustrated sectors. Once zones and sectors are established the UWB device selects various parameters to be used for inter-device communications based on the zone and sector of the destination UWB device.

There are various communication parameters that may be employed to enable communication between UWB devices. These communication parameters may include the UWB pulse modulation technique, the method of error detection and correction, the error control algorithm, the UWB pulse recurrence frequency, the data rate, the power of transmission, the UWB pulse shape, the configuration of the receiver, the UWB pulse width, the frame length, the frequency of master time reference synchronization, and other suitable communication parameters.

Ultra-wideband pulse modulation techniques enable a single representative data symbol to represent a plurality of binary digits, or bits. This has the obvious advantage of increasing the data rate in a communications system. A few examples of modulation include Pulse Width Modulation (PWM), Pulse Amplitude Modulation (PAM), and Pulse Position Modulation (PPM). In PWM, a series of predefined UWB pulse widths are used to represent different sets of bits. For example, in a system employing 8 different UWB pulse widths, each symbol could represent one of 8 combinations. This symbol would carry 3 bits of information. In PAM, predefined UWB pulse amplitudes are used to represent different sets of bits. A system employing PAM16 would have 16 predefined UWB pulse amplitudes. This system would be able to carry 4 bits of information per symbol. In a PPM system, predefined positions within an UWB pulse timeslot are used to carry a set of bits. A system employing PPM16 would be capable of carrying 4 bits of information per symbol. Additional UWB pulse modulation techniques may include: Coded Recurrence Modulation (CRM) as described in co-pending U.S. patent application Ser. No. 10/294,021, titled "ULTRA-WIDEBAND PULSE MODULATION SYSTEM AND METHOD"; Sloped Amplitude Modulation (SLAM) as described in co-pending U.S. patent application Ser. No. 10/188,987, titled "ULTRA-WIDEBAND PULSE GENERATION SYSTEM AND METHOD"; ternary modulation, as described in co-pending U.S. patent application Ser. No. to be assigned, filed Apr. 28, 2003, titled "ULTRA-WIDEBAND PULSE MODULATION SYSTEM AND METHOD", which claims priority to provisional patent application Ser. No. 60/452,020, of the same title; 1-pulse modulation, as described in co-pending U.S. patent application Ser. No. to be assigned, filed Apr. 29, 2003, titled "ULTRA-WIDEBAND PULSE MODULATION SYSTEM AND METHOD"; and other UWB pulse modulation methods as described in co-pending U.S. patent application Ser. No. 09/710,065, titled "ULTRA-WIDEBAND COMMUNICATION SYSTEM WITH AMPLITUDE MODULATION AND TIME MODULATION. All of the above-listed non-provisional and provisional United States patent applications are incorporated herein by reference in their entirety.

There are various methods of error detection and correction used in communication systems. The simplest form of error detection involves the use of a parity bit per block of data. The additional bit is set to ensure that the block has either an even number of ones, if even parity is used, or an odd number of ones if odd parity is employed. Use of parity will only detect an odd number of errors in a given block of data.

Another type of error detection is the Longitudinal Redundancy Check (LRC)/Vertical Redundancy Check (VRC) scheme. This method uses not only one parity bit per word, or row of the frame, considered now as a matrix, but also a "parity check character", comprising the entire last row of the matrix, with each bit in the row checking the parity of the corresponding column. The row parity bits form the last column and are called the VRC, while the column parity bits form the last row and are called the LRC or the parity check character. LRC/VRC will fail to detect conditions that have even number of errors in each column and each row.

A common and powerful technique of error detection is Cyclical Redundancy Check (CRC). In CRC the transmitter generates a Frame Check Sequence (FCS) of a length necessary to ensure that when the FCS is appended to the block of bits the augmented block is divisible by a predetermined number. On receipt, the number of bits is divided by the predetermined number, and if there is no remainder, the receiver assumes that the message is error free. Any of the above-described error detection methods, and other error detection methods not described, may be employed by the present invention.

There are essentially two groups of error correction algorithms: Backward Error Correction (BEC) and Forward Error Correction (FEC). In BEC, also known as Reverse Error Correction (REC), the first device sends a message, packet, or frame to a receiver. The second device checks the received data for error. If an error is detected, a request to retransmit the message, packet, or frame is sent to the first device. In contrast, when using Forward Error Correction (FEC) the second device corrects the error without retransmission of data from the first device. BEC has the advantage of simplicity, but generally requires duplex communications channels. Additionally, since the first device is required to retransmit frames, the overall information throughput is reduced. FEC allows for one-sided communications, but can be significantly more complex than BEC and can impose additional overhead in the data.

FEC algorithms are usually based on redundancy. The simplest form of FEC is to repeat each data bit a number of times. The receiving device could simply vote on what the data bit should be based on the bits received. In general, "n" errors can be detected and corrected using this method by repeating every bit 2n+1 times. There are numerous more complex FEC algorithms including, for example only, and not for limitation, Reed-Solomon coding, Viterbi coding, Turbo coding, and BCH coding. In the present invention, the methods of error detection and error-correction are communication parameters that an UWB enabled device can select to optimize communication with other UWB devices.

There are various common error control algorithms that are used in communication systems. Most of these algorithms are classified as automatic repeat request (ARQ) algorithms. In some error control schemes such as stop-and-wait ARQ, the receiving device responds to every message with either an acknowledgement (ACK) or with a negative acknowledgement (NACK). The first device will not continue transmission until either a NACK or an ACK is received from the second device. In Go-Back-N ARQ, the first device sends a number of frames and maintains a sliding window of size N. If an error is detected in a frame, the second device sends a NACK to the first device, and it discards all incoming frames until the erroneous frame is properly received. The first device must retransmit all frames from the one containing the error. Another variation on error control is Selective-Reject ARQ. In this algorithm the second device processes the correct frames and sends a NACK to the first device. The first device is then required to resend only frames received in error. In the present invention, these and other error control methods may be communication parameters that an UWB enabled device can employ to optimize communication with other UWB devices.

The ultra-wideband pulse recurrence frequency (PRF), or pulse transmission rate, is an additional communication parameter that a UWB enabled device employing the methods of the present invention may select. The PRF may be selected to be fixed, or variable based on the type or amount of data, or pseudo-random. Generally, a fixed PRF creates spectral lines at the PRF and its integer harmonics. This may be advantageous when concentration of spectral energy is desired. A pseudo-random PRF spreads or "whitens" the spectrum occupied by the UWB communications. Using a pseudo-random PRF spreads the UWB energy relatively evenly across the entire spectrum occupied. A variable PRF may be additionally employed where the PRF is "hopped" periodically based on some other parameter, which may include but is not limited to the data to be sent.

For example, in one embodiment of the present invention, an UWB device may select the data rate of a communication link based on distance information, RSSI information, or other types of information. The data rate in a UWB pulsed communication system is usually calculated as the product of the PRF and the number of bits-per-symbol that the selected modulation technique encodes on the UWB pulse stream. When using a variable or pseudo-random PRF the data rate is generally dependent on the effective PRF.

Another factor affecting communication quality and reliability is the bit-error-rate (BER), which is usually calculated as the ratio of bad bits to good bits. Thus, the BER is a way to measure data transmission integrity. Generally, the BER is usually dependent on the signal-to-noise ratio (SNR) at the receiver. One method to reduce BER and thereby improve the quality of service (QOS) is to improve the SNR by increasing the power of transmission of the UWB pulses, or signal. In one embodiment of the present invention, an UWB enabled device may select the UWB signal transmission power level as a communication parameter.

Another communication parameter that may be employed by the present invention is UWB pulse transmission power. Since Power Spectral Density (PSD) is the Fourier Transform of the autocorrelation function, and the shape of a UWB pulse affects the shape of the autocorrelation function, the specific shape of the transmitted UWB pulses impacts the distribution of the UWB signal power in the spectrum occupied. In environments where the transmitted power in certain frequencies is limited, UWB pulse shape is one method of controlling transmitted power levels. In one embodiment of the present invention, UWB pulse shape may be a parameter that an UWB enabled device may select when communicating with other UWB enabled devices. For example, the UWB pulse shape may comprise a Gaussian mono-cycle, a filtered substantially square pulse, a pre-distorted pulse, a pulse with a predetermined phase, a pulse with a predetermined amplitude, and other suitable pulse shapes.

Multi-path effects is another factor that affects communication quality and reliability. UWB pulses may be propagated over different paths, arriving at the intended receiver at different times, causing multi-path interference, or fading. One method of minimizing multi-path effects in wireless communication systems uses RAKE receivers. With a RAKE receiver, a number of delayed copies of the signal are correlated and added to the original signal to improve the SNR. The number of "fingers" in the receiver designates the number of delayed copies to be correlated and summed. In one embodiment of the present invention, the number of "fingers" in the receiver may be a parameter that may be selected to improve the quality and reliability of a communication system employing the methods of the present invention.

Another communication parameter that may be employed by the present invention is UWB variable pulse widths, or durations. According to the scaling property of the Fourier Transform, as the UWB pulse time duration or width increases, frequency content becomes more compact. The transmitted power for wide, or long duration UWB pulses in some cases may rise above the noise floor, possibly interfering with conventional RF signals. In one embodiment of the present invention, the power spectral density of wider, or longer duration UWB pulses may be controlled to ensure coexistence with conventional RF signals and to reduce distortion from the natural bandwidth of the channel. Additionally, wider, or longer duration UWB pulses contain more energy. For example, one embodiment of the present invention may employ UWB pulse widths, or durations that range from about 0.01 nanoseconds to about 1 millisecond. In one embodiment of the present invention, UWB pulse width, or duration is a parameter that may be selected by an UWB enabled device to improve the quality and reliability of an UWB communication system.

Another communication parameter that may be employed by the present invention is UWB variable frame sizes, or lengths. A frame is a group of time periods, or time bins into which UWB pulses may be placed. The frame may include UWB pulses that provide information for synchronization, carry data, aid in error correction, or contain other types of information, or provide other functions. Frame length and the frequency of synchronization can additionally impact the BER and therefore the QOS. Frames of long duration in a communication system that uses minimal synchronization frequency can suffer from increased BER due to relative clock drift between UWB enabled devices. In one embodiment of the present invention, frame length and the frequency of synchronization are parameters that may be selected, and varied by a UWB enabled device to improve the quality and reliability of an UWB communication system.

With reference to FIG. 3, one embodiment of an ultra-wideband communication system employing the methods described above may function in the following way: a UWB device located at the center of zone Z1 may communicate with a UWB device located in zone Z2, sector 1, by employing Reed-Solomon forward error correction, 16 level pulse amplitude modulation, a Gaussian monocycle pulse shape, a fixed pulse recurrence frequency of 100 MHz with an average power of 0.5 watts. The UWB device may select to process received communications from the remote UWB device in zone Z2 using 3 fingers in a RAKE receiver.

The same UWB device located at the center of zone Z1, when communicating with another UWB device in zone Z4, sector 2, may select Viterbi forward error correction, 4 level pulse amplitude modulation with 4 level pulse position modulation, a fixed pulse recurrence frequency of 75 MHz, an essentially rectangular pulse shape of 300 pico-second duration, and an average transmission power of one watt. The UWB device may select to process received communications from the UWB device in zone Z4 using 5 fingers in a RAKE receiver.

Another feature of the present invention is that it provides a method of sharing bandwidth between UWB enabled devices. In this embodiment, a UWB enabled device may route communications through other UWB enabled devices in order to achieve a reliable, and higher QOS communications link to the destination UWB enabled device. In one implementation of this embodiment, an UWB enabled device can obtain an estimation of the available bandwidth in the zones and sectors it has access to, and forward this information to other UWB enabled devices that it is communicating with. Thus, a first UWB device wishing to communicate with a second UWB device may establish either a direct communications link with the second UWB device, or alternatively route communications to the second UWB device through other UWB enabled devices, based on the provided available bandwidth information.

In one embodiment of the present invention, one of the UWB enabled devices is a fixed network access point (FNAP). In this embodiment, the FNAP knows its own geo-position in three-dimensional space. On function of the FNAP is to characterize the UWB communications environment within its geo-position to all UWB enabled devices in its range. Thus, the FNAP establishes preferred communications parameters with in its local communications environment and stores a channel model, a zone designation, and the communications parameters associated with is three-dimensional coordinates. As a new UWB enabled device powers up, or moves within range of the FNAP, the appropriate zone, three-dimensional geo-coordinates, and associated communications parameters are assigned to the new UWB enabled device by the FNAP.

A FNAP may be part of a larger UWB network, or may it may establish its own network. As defined herein, a network is a group of points or nodes connected by communication paths. The communication paths may be connected by wires, or they may be wirelessly connected. A network as defined herein can interconnect with other networks and contain subnetworks. A network as defined herein can be characterized in terms of a spatial distance, for example, such as a local area network (LAN), a personal area network (PAN), a metropolitan area network (MAN), a wide area network (WAN), and a wireless personal area network (WPAN), among others. A network as defined herein can also be characterized by the type of data transmission technology in use on it, for example, a TCP/IP network, and a Systems Network Architecture network, among others. A network as defined herein can also be characterized by whether it carries voice, data, or both kinds of signals. A network as defined herein can also be characterized by who can use the network, for example, a public switched telephone network (PSTN), other types of public networks, and a private network (such as within a single room or home), among others. A network as defined herein can also be characterized by the usual nature of its connections, for example, a dial-up network, a switched network, a dedicated network, and a nonswitched network, among others. A network as defined herein can also be characterized by the types of physical links that it employs, for example, optical fiber, coaxial cable, a mix of both, unshielded twisted pair, shielded twisted pair, or a wireless medium, such as air.

One drawback of a network is the possibility of multi-user interference (MUI), which generally results from multiple UWB enabled devices communicating in a close geographical region. In one embodiment of the present invention, a fixed access point assigns time periods to each zone for communication. In this embodiment, consecutive time periods are assigned to zones that may not be geographically contiguous. This assignment may be accomplished on a functional logic block (FLB) basis that may be similar to a Time Division Multiple Access (TDMA) scheme. For example, in one embodiment of the present invention, a fixed access point may divide its surrounding area into 4 concentric zones Z1, Z2, Z3 and Z4, as shown in FIG. 3. A first FLB, FLB 1 may be assigned to UWB enabled devices within zone Z2, and a second FLB, FLB 2 may be assigned to devices within zone Z4, a third FLB, FLB 3 may be assigned to UWB enabled devices within zone Z1, and a fourth FLB, FLB 4 may be assigned to zone Z3. Alternatively, time slots within a FLB may be assigned to zones in a similar manner. Devices within each zone can access the assigned time period on either a contention basis, such as employed by ALOHA, CSMA, or CSMA-CD schemes, or on a pre-assigned basis.

Referring to TABLE 1, one embodiment of the present invention comprises a method for assignment of time periods available for transmitting UWB pulses within a UWB communications network. The time periods are made available by first determining the number of zones within a geographical area. Once the number of zones is established, the number of FLBs, or alternatively, time slots within the FLBs are selected. Diversity, or non-repetition in time period assignment is then created by first counting incrementally by the appropriate zone number, then eliminating repetition between the time bins assigned. For example, in one type of system there may be eight zones (Z1-Z8), and the assignment repetition rate may be 30. That is, 30 time bins are included within a frame (as defined above, a frame is a group of time periods, or time bins into which UWB pulses may be placed), and each zone is allocated specific time bins within the frame. Thus, each UWB device must only analyze the time bins that are allocated to it, depending upon which zone the UWB device is located.

The first step of the assignment method of the present invention is to count sequentially by zone number as shown in TABLE 1.

TABLE 1

| Zone | Time Periods |
| --- | --- |
| Z1 | 1, 2, 3, 4, 5, 6, 7, 8, 9, 10, 11, 12, 13, 14, 15, 16, 17, 18, 19, 20, 21, 22, 23, 24, 25, 26, 27, 28, 29, 30 |
| Z2 | 1, 3, 5, 7, 9, 11, 13, 15, 17, 19, 21, 23, 25, 27, 29 |
| Z3 | 1, 4, 7, 10, 13, 17, 20, 23, 26, 29 |
| Z4 | 1, 5, 9, 13, 17, 21, 25, 29 |
| Z5 | 1, 6, 11, 16, 21, 26 |
| Z6 | 1, 7, 13, 19, 25 |
| Z7 | 1, 8, 15, 23, 30 |
| Z8 | 1, 9, 17, 25 |

Following the initial assignment, duplicate time periods, or bins are eliminated. This can be accomplished in a number of ways. In this example, the elimination of duplicate time bins is accomplished from the highest numerical zone (Z8) to the lowest numerical zone (Z1). In zone Z8 there is an assignment of the 1, 9, 17, and 25 time bins. These time bins are eliminated in the frames used by UWB devices located in zones Z1 through Z7, as shown below in TABLE 2. The remaining time bin assignments for zone Z7 are then eliminated from zones Z1 through Z6 in the same manner. This process is continued until all duplicity, or repetition is removed from the time bin assignments. TABLE 2 shows the result of this method of time bin assignments.

TABLE 2

| Zone | Time Periods |
| --- | --- |
| Z1 | 2, 12, 14, 18, 22, 24, 28 |
| Z2 | 3, 27 |
| Z3 | 4, 10, 20 |
| Z4 | 5, 29 |
| Z5 | 6, 11, 16, 21, 26 |
| Z6 | 7, 13, 19 |
| Z7 | 8, 15, 23, 30 |
| Z8 | 1, 9, 17, 25 |

In TABLE 2 it is seen that the distribution of FLBs or alternatively time bins is not evenly distributed. The zones containing more time bins, or FLBs will have a higher bandwidth capacity than zones with fewer time bins, or FLBs. One feature of the present invention is that zone allocation may be based on bandwidth demand. That is, zones may not be geographically allocated (with a local UWB device at the center of zone Z1), but instead they may be allocated so that higher bandwidth zones are allocated to areas that contain a dense population of UWB devices, or to areas that have a high bandwidth demand. Thus, in one embodiment of the present invention, a local UWB device may be located at the center of zone Z8.

Thus, one feature of the present invention is that it provides a method, system, computer software or logic and/or computer hardware for providing a high QOS in an UWB communication system by providing dynamic bandwidth allocation. In one embodiment of the present invention, a local UWB enabled device may assign zones based on a population density of UWB devices within each zone, assigning zones that contain more time bins to areas that have a higher density of UWB devices. These zone assignments may change, based on changes in bandwidth demand. Alternatively, the geographic configuration of the zones may change, so that areas that have less UWB devices can be incorporated, or merged into other zones to create a zone with more users. Thus, this method of bandwidth allocation may result in zones that are not circular, or spherical, but instead may have irregular shapes.

Referring to FIG. 3, one method of practicing the present invention is illustrated. A first UWB enabled device (not shown) is located at the center of zone Z1. Other UWB devices may be located in any of the other zones Z1, Z2, Z3, and Z4. The first UWB device may obtain distance, RSSI, BER and other types of information relating to each of the other UWB devices that are in communication with the first UWB device. Based on the data received from the communicating UWB devices, zones Z1 through Z4 and sectors 1 through 4 are established. The determination of the number of, and the size of, zones and sectors may be based on distance data, on the density of RF signals, on other types of information discussed above, or on a combination of types of information.

When communicating with UWB devices, the first UWB device determines the zone and sector of the other UWB device. Based on the zone and sector, the first UWB device selects appropriate communications parameters for communication with the other UWB device. A UWB device may be a phone, a personal digital assistant, a portable computer, a laptop computer, any network as described above (LAN, WAN, PAN etc.), video monitors, computer monitors, or any other device employing UWB technology.

Figure 4:
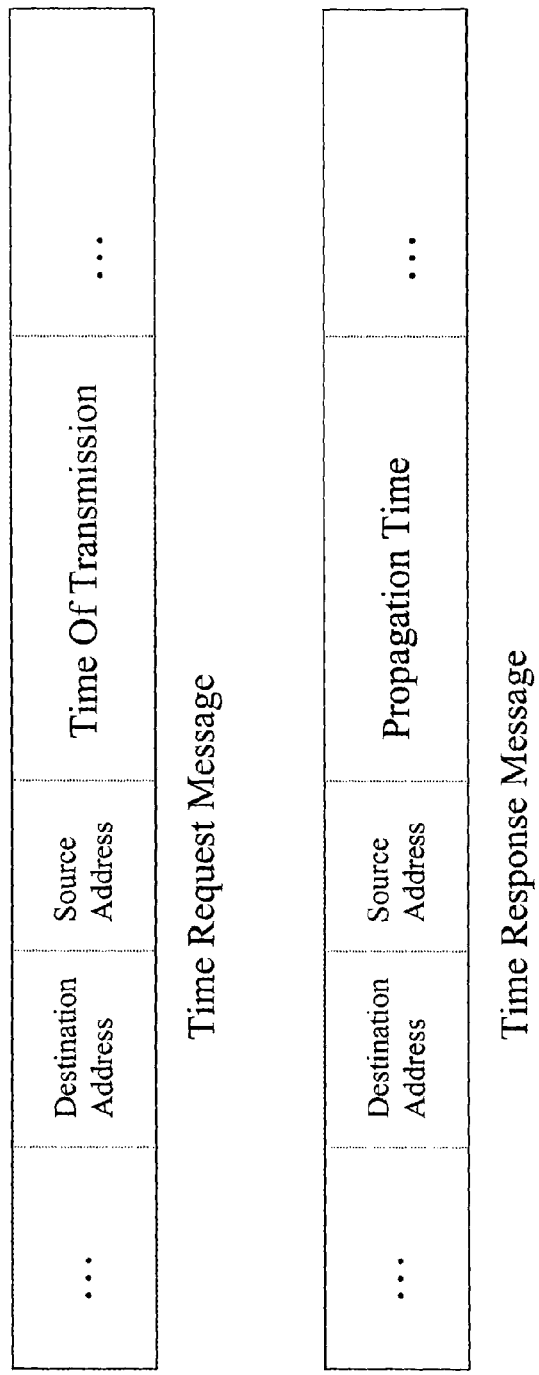
FIG. 4 shows a time request message and an associated time response message in accordance with one embodiment of the present invention.

Referring to FIG. 4, one type of messaging used to establish distance between UWB enabled devices is displayed. A first UWB enabled device broadcasts a "time request message" to at least one other UWB enabled device, that is time synchronized with the first UWB device by a master time reference. The "time request message" includes the time of broadcast, or transmission from the first UWB device. Other UWB enabled device(s) can then determine the distance to the first UWB device by subtracting the time that the "time request message" was received from the embedded transmission time contained in the "time request message." The time difference is the propagation time, and because RF energy generally propagates at approximately the speed of light, the distance between the communicating UWB devices may be determined.

In addition, the first UWB device can determine the distance to other UWB device(s) by receiving a "time response message" that includes the calculated propagation time from which the distance to the responding UWB device can be determined. In an alternative embodiment, the UWB device may also independently verify the distance to the responding UWB device by subtracting the time that the "time response message" was received from an embedded transmission time contained in the "time response message." In this embodiment, each UWB device includes the transmission time in each message that is sent. Because all the communicating UWB devices are time synchronized to each other by a master time reference, distance calculations based on time differences are accurate.

Referring to FIG. 5 another method of practicing the present invention is illustrated. This embodiment is another method of messaging used to establish distance between UWB enabled devices. A first UWB enabled device broadcasts a "distance request message" to at least one other UWB device, that is time synchronized with the first UWB device by a master time reference. The "distance request message" includes the time of broadcast, or transmission from the first UWB device. Other UWB enabled device(s) receive the message, and also register the time that the message was received. The receiving UWB device then determine the distance to the first UWB device by subtracting the time that the "distance request message" was received from the embedded transmission time contained in the "time request message."

In addition, the first UWB device can determine the distance to other UWB device(s) by receiving a "distance response message" that includes the distance calculated by the receiving UWB device. In this embodiment, the "distance response message" includes the distance and the time of transmission of the "distance response message," which is referenced to the master time reference. The first UWB device can verify the distance from each responding UWB device by referencing the time of transmission included in the "distance response message" with the time of arrival of the "distance response message."

Figure 6:
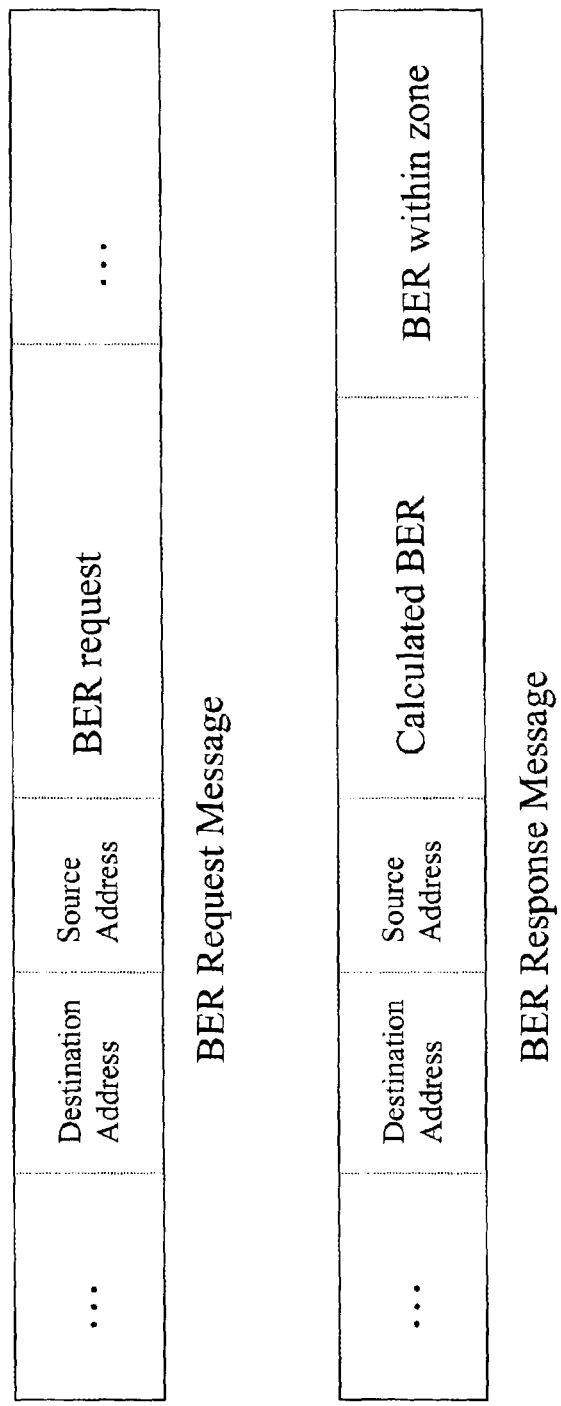
FIG. 6 shows a BER request message and an associated BER response message in accordance with one embodiment of the present invention.

Referring to FIG. 6 another method of practicing the present invention is illustrated. This embodiment is a method of messaging used to determine the type of communication parameters for use between UWB enabled devices. A first UWB device broadcasts a "bit-error-rate (BER) request message" to at least one UWB enabled device. The "BER request message" contains a predetermined sequence of symbols that all the communicating UWB have in computer memory, or in another suitable location. The sequence of symbols may be a representation of an arbitrary group of binary digits, such as "0101," or "00110011," or any other desired group of symbols.

The receiving UWB device(s) receive the "BER request message," and determine the bit-error-rate by comparison of the received symbols with the predetermined sequence of symbols contained in computer memory. The UWB device(s) then respond with a "BER response message" that includes the calculated BER, and if a distance between the UWB devices is known, the probable BER to other UWB devices within a similar distance, or zone.

Referring to FIG. 7 another method of practicing the present invention is illustrated. This embodiment is another method of messaging used to determine the type of communication parameters for use between UWB enabled devices. A first UWB enabled device broadcasts a "fixed energy request message" at a predetermined energy level to at least one other UWB enabled device. The other UWB enabled device(s) know the predetermined energy level, as it may be contained in computer memory, or in another suitable location. The UWB device(s) receive the "fixed energy request message", and determine the received energy of the "fixed energy request message," comparing it with the predetermined energy level. The difference is a received signal strength indicator (RSSI). The receiving UWB device(s) then respond with a "fixed energy response message" that contains the RSSI. The first UWB device then receives the "fixed energy response message" containing the RSSI information, and may then set the types of communication parameters for the communicating UWB devices, based on the RSSI information.

An alternative embodiment of this method may have the first UWB device calculate its own RSSI by determining the energy level of the "fixed energy response message" and compare it to the predetermined energy level. In this way, changing communication conditions, such as moving UWB devices, or other variables can be accounted for. In this embodiment, the "fixed energy response message" is broadcast at a fixed energy level so that the first UWB device can determine the RSSI for the "fixed energy response messages" and compare it to the RSSI information in those responses. By comparing the RSSI information, accurate communication parameters can be established.

Figure 8:
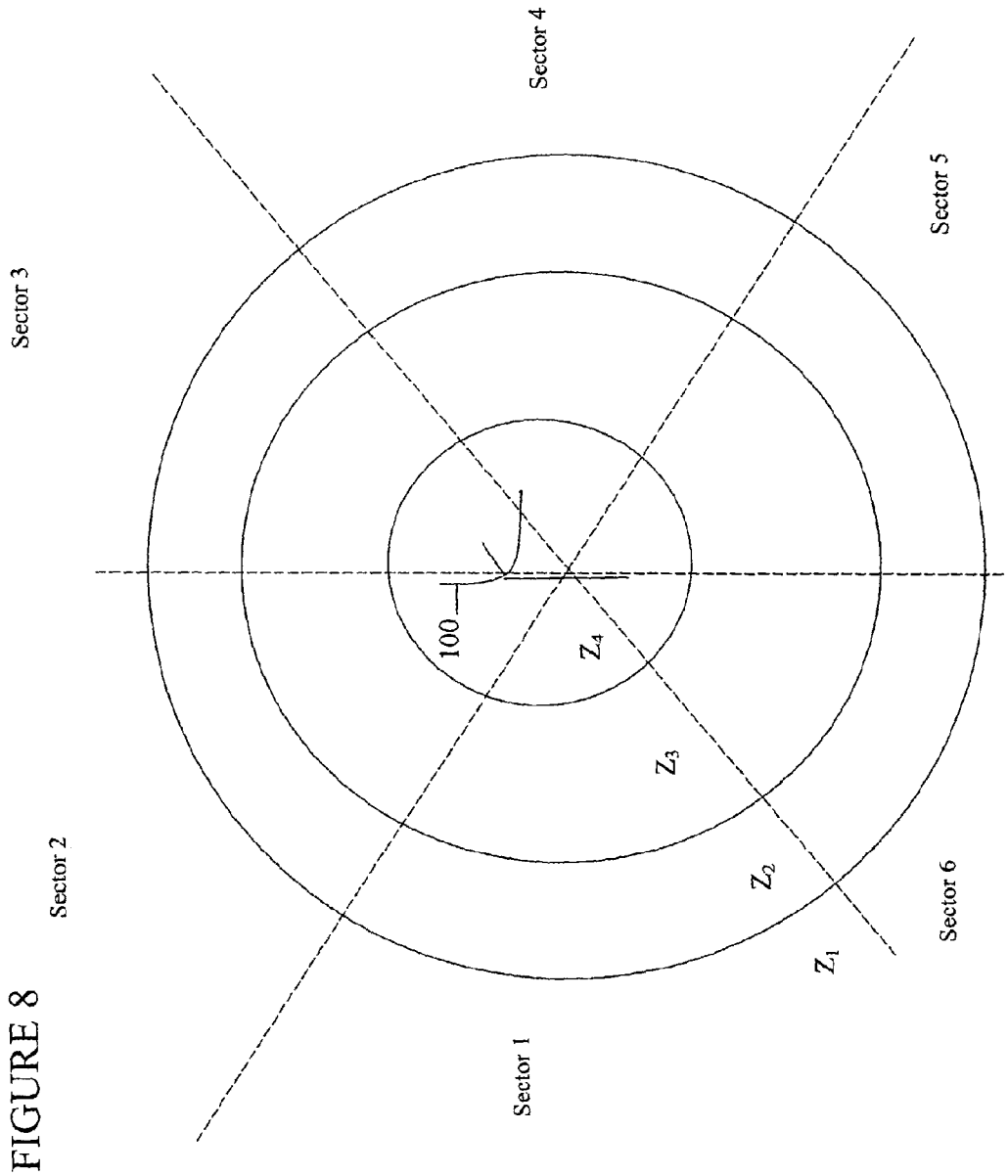
FIG. 8 shows a sectorized zone system with a fixed access point in accordance with one embodiment of the present invention.

Shown in FIG. 8 is an example of one embodiment of the present invention, where at least one of the remote UWB enabled devices is a fixed UWB access point 100, such as an antenna, network node, or other suitable device. The fixed access point 100 in this embodiment generates the master time reference for all the UWB devices that communicate within its range, or network. For example, each UWB device in range of, or communicating with the fixed access point 100 synchronizes itself in accordance with the methods disclosed in co-pending U.S. patent application Ser. No. 09/805,735, filed Mar. 13, 2001, titled: MAINTAINING A GLOBAL TIME REFERENCE AMONG A GROUP OF NETWORKED DEVICES, which is, and has been, incorporated herein by reference in its entirety. Additionally, the fixed access point 100 may or may not assign zones and sectors to the UWB enabled devices within its range, or network.

Figure 9:
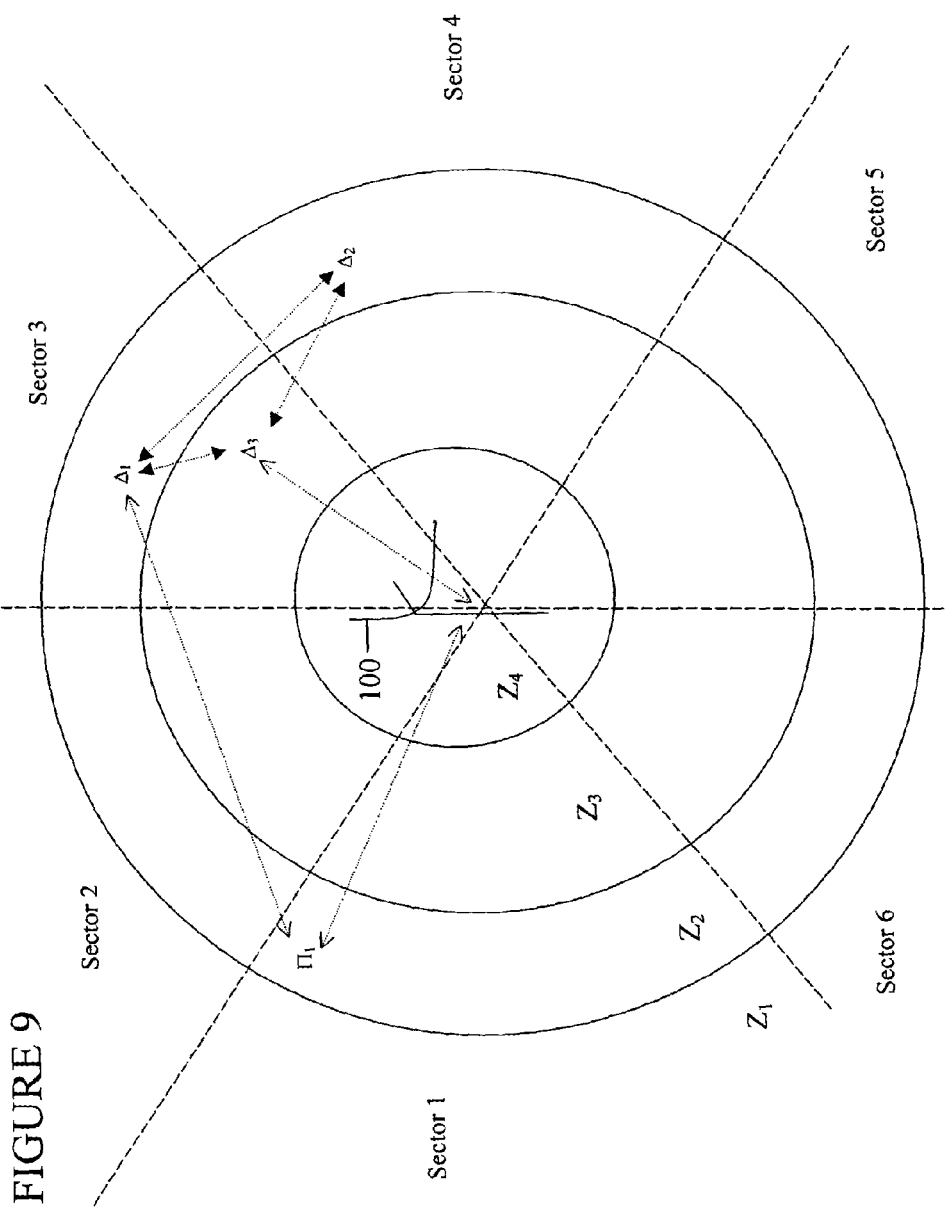
FIG. 9 shows UWB enabled devices communicating in a sectorized zone system with a fixed access point in accordance with one embodiment of the present invention.

Referring now to FIG. 9, one embodiment of an ultra-wideband (UWB) communication network is illustrated. The fixed access point 100 provides a communications link, and a master time reference to UWB devices D1, D2, D3, and P1. The UWB devices D1, D2, D3, P1 may communicate directly with the fixed access point 100, as shown by devices D3 and P1, or within their own network as shown by D1, D2, and D3. Additionally, the UWB device P1 may communicate directly with the UWB device D1 that is involved in communications with devices D2, and D3, which is communicating with the fixed access point 100. In one embodiment of the present invention, as shown in FIG. 9, communications between UWB device D1 and the fixed access point 100 may be routed through UWB device D3 or P1. Alternatively, based on zone and sector assignment, and/or based on other communications parameters, device D1 may establish a direct communications link with fixed access point 100.

Figure 10:
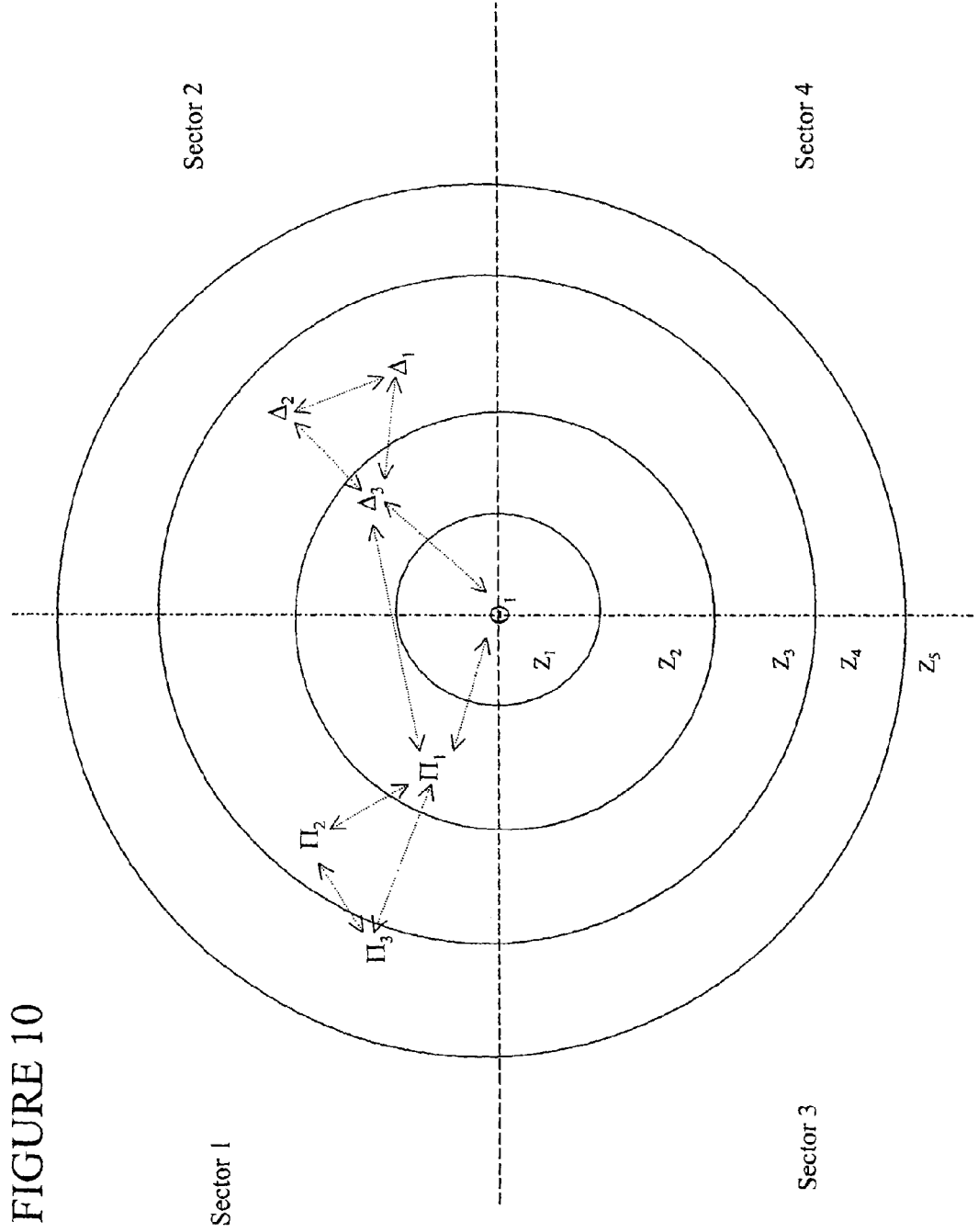
FIG. 10 shows a UWB enabled device communicating with other UWB enabled devices in the absence of a fixed access point in accordance with one embodiment of the present invention.

Referring now to FIG. 10, another embodiment of an ultra-wideband (UWB) communication network is illustrated. In this embodiment, UWB devices P1, P2, P3, D1, D2, D3 may not be within range of a fixed access point 100 as shown in FIGS. 8-9 to establish a communication network through the fixed access point 100. In this embodiment of the present invention, UWB enabled devices P1, P2, P3, and D1, D2, D3 are shown communicating within their own respective networks. These networks may be private, and/or secure, or they may be accessible by other UWB devices. In this embodiment, a mobile UWB enabled device Q1 can function as a fixed access point 100, assigning zones and sectors, and establishing a master time reference to the UWB devices within its range, or network. Alternatively, each UWB enabled device P1, P2, P3, D1, D2, D3 may establish its own zones and sectors for enabling reliable communication to other UWB enabled devices. In addition, routing of communications between UWB devices may be through any available path, as shown in FIG. 10, where device P3 and device D1 communicate through UWB device Q1, or UWB devices P3 and D1 may establish a direct communications link. In this embodiment, time synchronization between networks of devices may be achieved in accordance with the methods described in co-pending U.S. patent application Ser. No. 09/805,735, filed Mar. 13, 2001, titled: MAINTAINING A GLOBAL TIME REFERENCE AMONG A GROUP OF NETWORKED DEVICES, which is, and has been, incorporated herein by reference in its entirety.

Figure 11:
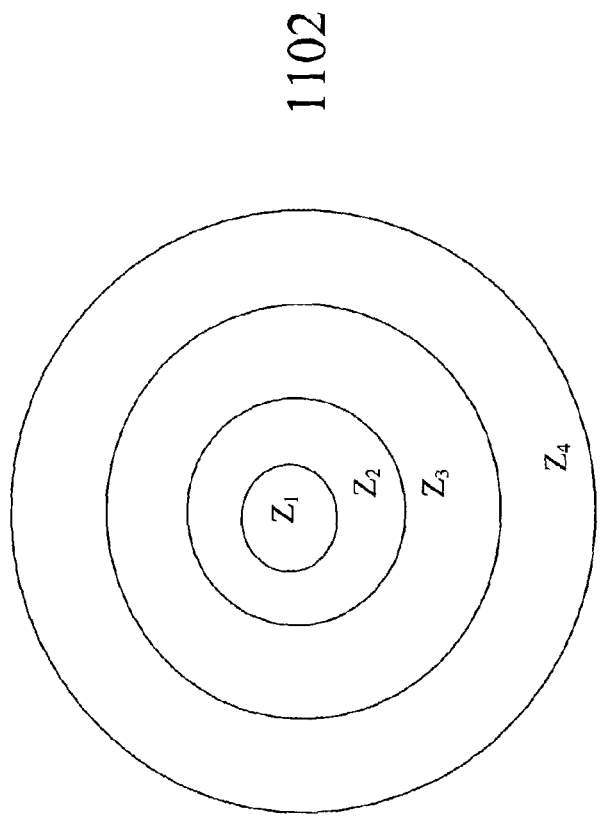
FIG. 11 shows spatial diversity assignment of time bins in accordance with one embodiment of the present invention.

Referring now to FIG. 11, spatial diversity is achieved and hence multi-user interference (MUI) is reduced by the assignment of FLBs, or alternatively time bins within FLBs, to different geographical zones. In this embodiment of the present invention, a UWB enabled device (not shown) establishes zones 1102 (Z1, Z2, Z3, and Z4). In communication with other UWB devices within each zone Z1, Z2, Z3, Z4, the UWB enabled device may use the following FLB or time bin 1101 assignment: FLB 1101(1) may be used to communicate with UWB devices within zone Z3; FLB 1101(2) may be used to communicate with UWB devices within zone Z1; FLB 1101(3) may be used to communicate with UWB devices within zone Z4; and FLB 1101(4) may be used to communicate with UWB devices within zone Z2. In this embodiment, the FLB, or time bin assignment pattern is then repeated for subsequent communications.

Thus, it is seen that various ultra-wideband wireless communication methods are provided. One skilled in the art will appreciate that the present invention can be practiced by other than the above-described embodiments, which are presented in this description for purposes of illustration and not of limitation. The description and examples set forth in this specification and associated drawings only set forth preferred embodiment(s) of the present invention. The specification and drawings are not intended to limit the exclusionary scope of this patent document. Many designs other than the above described embodiments will fall within the literal and/or legal scope of the following claims, and the present invention is limited only by the claims that follow. It is noted that various equivalents for the particular embodiments discussed in this description may practice the invention as well.

What is claimed is:

1. A method of selecting at least one communication parameter in an ultra-wideband communication system based on a bit-error-rate, the method comprising:
   transmitting a bit-error-rate message from a first ultra-wideband device to a second ultra-wideband device;
   receiving a bit-error-rate response message from the second ultra-wideband device, wherein the bit-error-rate response message contains the bit-error-rate; and
   selecting at least one communication parameter based on the bit-error-rate, wherein the at least one communication parameter includes an ultra-wideband pulse shape.

2. The method of claim 1, wherein the transmitted bit-error-rate message comprises a known number of bits.

3. The method of claim 1, wherein the bit-error-rate is based on a number of bits received by the second ultra-wideband device.

4. The method of claim 1, wherein the at least one communication parameter is selected from a group consisting of:
   an ultra-wideband pulse modulation technique, a method of error detection, a method of error correction, a method of error control, a ultra-wideband pulse recurrence frequency, a data rate, a power of transmission, a configuration of a receiver, an ultra-wideband pulse width, a frame length, and a rate of time synchronization.

5. The method of claim 1, wherein the bit-error-rate is calculated by comparing a received sequence of bits with a predetermined sequence of bits.

6. The method of claim 1, wherein the received bit-error-rate message from the second ultra-wideband device includes a probable bit-error-rate between the first ultra-wideband device and a third ultra-wideband device.

7. The method of claim 6, wherein the probable bit-error-rate is based on a distance between the first ultra-wideband device and the third ultra-wideband device.

8. A system comprising:
 a transmitter configured to transmit a bit-error-rate message from a first ultra-wideband device to a second ultra-wideband device;
 a receiver configured to receive a bit-error-rate response message from the second ultra-wideband device, wherein the bit-error-rate response message contains a bit-error-rate; and
 a processor configured to select at least one communication parameter based on the bit-error-rate, wherein the at least one communication parameter includes an ultra-wideband pulse shape.

9. The system of claim 8, wherein the transmitted bit-error-rate message comprises a known number of bits.

10. The system of claim 8, wherein the bit-error-rate is based on a number of bits received by the second ultra-wideband device.

11. The system of claim 8, wherein the at least one communication parameter is selected from a group consisting of: an ultra-wideband pulse modulation technique, a method of error detection, a method of error correction, a method of error control, a ultra-wideband pulse recurrence frequency, a data rate, a power of transmission, a configuration of a receiver, an ultra-wideband pulse width, a frame length, and a rate of time synchronization.

12. The system of claim 8, wherein the bit-error-rate is calculated by comparing a received sequence of bits with a predetermined sequence of bits.

13. The system of claim 8, wherein the received bit-error-rate message from the second ultra-wideband device includes a probable bit-error-rate between the first ultra-wideband device and a third ultra-wideband device.

14. The system of claim 13, wherein the probable bit-error-rate is based on a distance between the first ultra-wideband device and the third ultra-wideband device.

15. A non-transitory computer-readable medium having instructions stored thereon for selecting at least one communication parameter in an ultra-wideband communication system based on a bit-error-rate, the instructions comprising:
 instructions for transmitting a bit-error-rate message from a first ultra-wideband device to a second ultra-wideband device;
 instructions for receiving a bit-error-rate response message from the second ultra-wideband device, wherein the bit-error-rate response message contains the bit-error-rate; and
 instructions for selecting at least one communication parameter based on the bit-error-rate, wherein the at least one communication parameter includes an ultra-wideband pulse shape.

16. The non-transitory computer readable-medium of claim 15, wherein the transmitted bit-error-rate message comprises a known number of bits.

17. The non-transitory computer readable-medium of claim 15, wherein the bit-error-rate is based on a number of bits received by the second ultra-wideband device.

18. The non-transitory computer readable-medium of claim 15, wherein the at least one communication parameter is selected from a group consisting of:
 an ultra-wideband pulse modulation technique, a method of error detection, a method of error correction, a method of error control, a ultra-wideband pulse recurrence frequency, a data rate, a power of transmission, a configuration of a receiver, an ultra-wideband pulse width, a frame length, and a rate of time synchronization.

19. The non-transitory computer readable-medium of claim 15, wherein the bit-error-rate is calculated by comparing a received sequence of bits with a predetermined sequence of bits.

20. The non-transitory computer readable-medium of claim 15, wherein the received bit-error-rate message from the second ultra-wideband device includes a probable bit-error-rate between the first ultra-wideband device and a third ultra-wideband device.

* * * * *